United States Patent
Carrie et al.

(10) Patent No.: US 11,237,274 B2
(45) Date of Patent: Feb. 1, 2022

(54) MULTI-ANTENNA DEVICE FOR THE REJECTION OF MULTI-PATHS IN A SATELLITE NAVIGATION SYSTEM AND ASSOCIATED METHOD

(71) Applicants: THALES, Courbevoie (FR); CENTRE NATIONAL D'ETUDES SPATIALES, Paris (FR)

(72) Inventors: Guillaume Carrie, Toulouse (FR); Céline Berland, Toulouse (FR); Franck Barbiero, Toulouse (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 421 days.

(21) Appl. No.: 16/357,259

(22) Filed: Mar. 18, 2019

(65) Prior Publication Data
US 2019/0293803 A1 Sep. 26, 2019

(30) Foreign Application Priority Data
Mar. 22, 2018 (FR) ...................................... 1800238

(51) Int. Cl.
*G01S 19/22* (2010.01)
*G01S 19/36* (2010.01)

(52) U.S. Cl.
CPC .............. *G01S 19/22* (2013.01); *G01S 19/36* (2013.01)

(58) Field of Classification Search
CPC ........................... G01S 19/22; G01S 19/35–37
See application file for complete search history.

(56) References Cited

U.S. PATENT DOCUMENTS 8,655,298 B2    2/2014  Martin et al.
2012/0286994 A1  11/2012  Letestu et al.

FOREIGN PATENT DOCUMENTS

WO    2012/025306 A1    3/2012
WO    WO-2012025306 A1 *  3/2012    ............. G01S 19/22

OTHER PUBLICATIONS

Xu, et al., "A Maximum-likelihood Based Mutual Coupling Calibration Algorithm in the Presence of Multipath for GPS Antenna Array", GNSS 2011—Proceedings of the 24th International Technical Meeting of the Satellite Division of the Institute of Navigation (ION GNSS 2011 ), VA, USA, p. 1111, Sep. 23, 2011.

(Continued)

*Primary Examiner* — Cassi J Galt
(74) *Attorney, Agent, or Firm* — BakerHostetler

(57) ABSTRACT

A method is provided for estimating the parameters of useful signal and multi-path signals originating from a radiolocation signal emitted by a satellite, a location device comprising at least two sensors able to receive the signal. The method comprises the steps of: correlating the signal received by the sensors with a local code by means of correlators, constructing, for each sensor, a sampled intercorrelation function intercorrelating the signal received with the local code, determining a spatio-temporal intercorrelation function on the basis of the concatenation of the intercorrelation functions obtained in the previous step for each sensor, estimating parameters representative of the useful signal and of the multi-path signals by applying a maximum likelihood algorithm, the representative parameters including at least one complex amplitude estimated independently for each sensor.

5 Claims, 5 Drawing Sheets

(56) References Cited

OTHER PUBLICATIONS

Konovaltsev, et al., "Autonomous Spoofing Detection and Mitigation with a Miniaturized Adaptive Antenna Array", GNSS 2014—Proceedings of the 27th International Technical Meeting of the Satellite Division of the Institute of Navigation (ION GNSS+2014), VA, USA, pp. 2853-2861, Sep. 12, 2014.

* cited by examiner

401: Correlating the signal received by sensors with a local code by the correlators of the device.

402: Constructing, for each sensor, a sampled intercorrelation function intercorrelating the signal received with the local code.

403: Determining a spatio-temporal intercorrelation function on the basis of the concatenation of the intercorrelation functions obtained in step 402 for each sensor.

404: Parametric model or models of signals whose representative parameters have been estimated at the previous iterations of this step is or are subtracted, from the spatio-temporal intercorrelation function.

405: Parameters representative of a multi-path signal or of the useful signal are estimated by applying a maximum likelihood algorithm to the result of the previous subtraction.

FIG. 4

MULTI-ANTENNA DEVICE FOR THE REJECTION OF MULTI-PATHS IN A SATELLITE NAVIGATION SYSTEM AND ASSOCIATED METHOD

CROSS-REFERENCE TO RELATED APPLICATIONS

This application claims priority to foreign French patent application No. FR 1800238, filed on Mar. 22, 2018, the disclosure of which is incorporated by reference in its entirety.

FIELD OF THE INVENTION

The field of the invention relates to satellite navigation systems and more particularly to radiolocation devices based on calculating the propagation time of the signals emitted by the satellites.

BACKGROUND

By "satellite navigation system" is meant here any system dedicated to wide-area navigation, such as for example the existing GNSS ("Global Navigation Satellite System") systems called GPS, GLONASS or GALILEO, as well as all their equivalents and derivatives. The person skilled in the art is well aware of the principle of location of satellite navigation systems. The radiofrequency signal emitted by a satellite is coded and the time taken by this signal to reach the receiver to be located is used to determine the distance between this satellite and this receiver, called the pseudo-distance. The precision of satellite navigation systems is impaired by a certain number of errors. These errors can be split into two categories: global contributions and local contributions. It is possible to cite for the global contributions the errors related to the passage of the electromagnetic waves through the ionosphere and the errors related to the satellites (orbit errors and clock errors). As regards the local contributions, it is possible to cite the errors related to the passage of the electromagnetic waves through the troposphere, the errors of reflection of the signals, the errors related to interference, the errors due to the white areas and the noise of the receivers.

In an urban environment as illustrated by FIG. 1, the radiolocation device is particularly impaired by the phenomenon of the reflection of the signals on urban obstacles such as for example building facades. FIG. 1 represents an automotive vehicle travelling around in an urban environment and a satellite emitting radiolocation signals. The multi-paths MP on the useful signals LOS constitute the predominant defects for location. Indeed, the multi-path signals MP introduce a bias into the estimation of the signal propagation time thereby causing receiver location errors. It is important to be able to remove or estimate these multi-paths so as to improve the precision of location of location devices.

International patent application WO 2012/025306 describes a satellite radionavigation signal reception device able to estimate and remove the multi-paths impairing the received signal. Such a device comprises several antennas or sensors and several correlators.

A drawback of this solution is that it implements a method for estimating the parameters of the multi-path signals which assumes that all the sensors of the device are identical and in particular that they all exhibit identical radiation patterns.

However, in reality, this feature is not satisfied and, on the contrary, the radiation patterns are different, especially because of coupling phenomena. Not taking these differences into account may result in the solution described in the aforementioned patent application being rendered inoperative.

The invention proposes an enhancement to the method and to the device described in application WO 2012/025306 so as to take into account the differences in radiation patterns of the various antennas of the reception device.

SUMMARY OF THE INVENTION

Thus, one subject of the invention is a method for estimating the parameters of useful signal and multi-path signals originating from a radiolocation signal emitted by a satellite, by means of a location device comprising at least two sensors able to receive the said signal, each of the said sensors being connected to at least two lines for processing the signals, each processing line comprising a correlator and at least one delay line able to introduce a delay corresponding to a multiple of the duration of integration of the correlators, the method comprising the steps of:
  Correlating the signal received by the said sensors with a local code by means of correlators,
  Constructing, for each sensor, a sampled intercorrelation function intercorrelating the signal received with the local code, for various post-correlation instants,
  Determining a spatio-temporal intercorrelation function on the basis of the concatenation of the intercorrelation functions obtained in the previous step for each sensor,
  Executing iteratively, for each multi-path signal and the useful signal, the sub-steps of:
    Subtracting, from the spatio-temporal intercorrelation function, the parametric model or models of signals estimated at the previous iterations,
    Estimating the parameters representative of a multi-path signal or of the useful signal by applying a maximum likelihood algorithm to the result of the previous subtraction, by applying the sub-steps of:
      Estimating the direction of arrival of the signal by utilizing all the sensors jointly,
      Estimating the complex amplitude of the signal independently for each sensor, by using the estimated direction of arrival, Projecting the estimated complex amplitude onto the sub-space defined by the estimated direction of arrival so as to preserve, in the independent estimation of the complex amplitude, the component corresponding to the direction of arrival estimated in the previous step.

According to a particular aspect of the invention, the said representative parameters include the propagation delay, the Doppler frequency and the direction of arrival of a signal.

Another subject of the invention is a location device able to discriminate a useful signal from multi-path signals, the device comprising at least two sensors of radiolocation signals emitted by a satellite, each of the said sensors being connected to at least two lines for processing the signals, each processing line comprising a correlator and at least one delay line able to introduce a delay corresponding to a multiple of the duration of integration of the correlators, the device comprising means for processing the signals configured to implement a maximum likelihood estimation algorithm so as to estimate parameters representative of the useful signal and multi-path signals, on the basis of the signals taken at the output of the delay lines, the said representative parameters including at least one complex amplitude estimated independently for each sensor.

According to a particular aspect of the invention, a correlator of a first processing line is spaced apart by a fraction of the symbol period of the spreading code with respect to the correlator of a second processing line.

According to a particular aspect of the invention, the maximum likelihood estimation algorithm is of "SAGE" type.

BRIEF DESCRIPTION OF THE DRAWINGS

Other characteristics and advantages of the present invention will become more clearly apparent on reading the description which follows in relation to the appended drawings which represent.

DETAILED DESCRIPTION

The description of the location device described in application WO 2012/025306 is taken up again here. The location device according to the present invention is based on the device previously described in the aforementioned application and affords improvements with respect to the latter.

Figure 1:
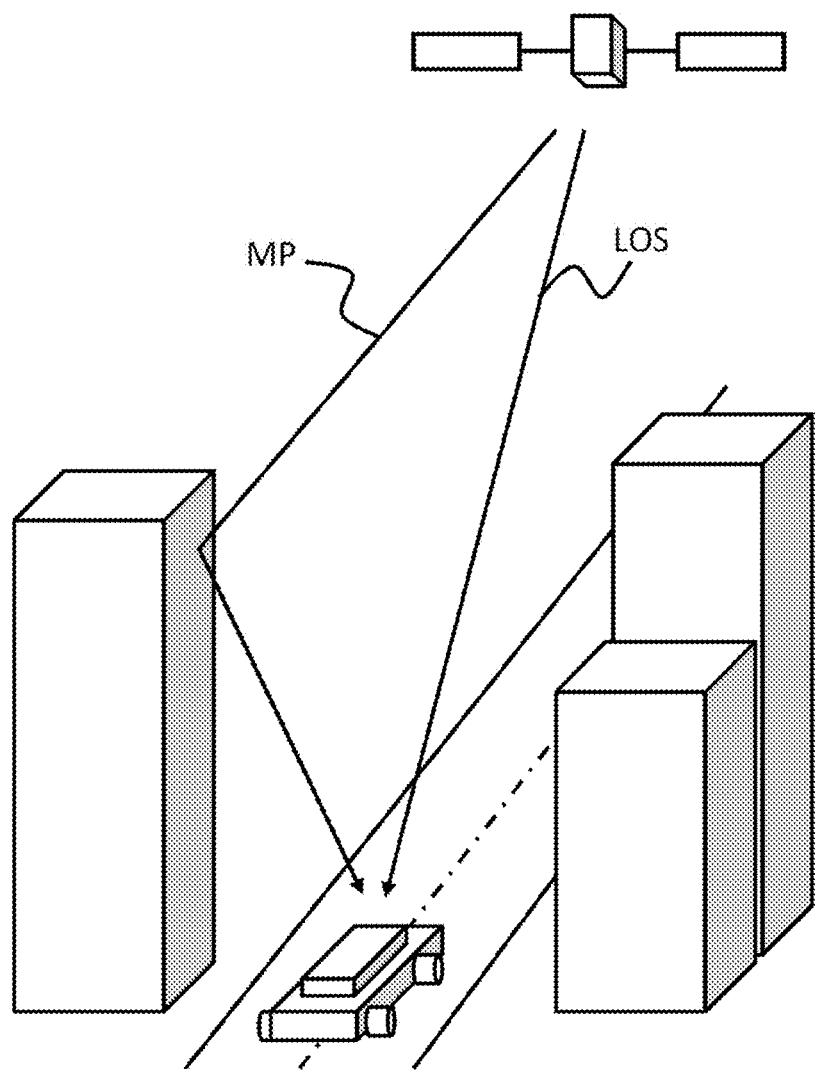
FIG. 1, a mobile receiving the radiolocation signals emitted by a satellite in an urban environment, FIG. 2, a diagram of an architecture of location device according to the invention, FIGS. 3a-3f, several charts illustrating a correlation function measured on each reception pathway for various spreading codes PRN, FIG. 4, a flowchart describing the main steps of the method according to the invention.
Figure 2:
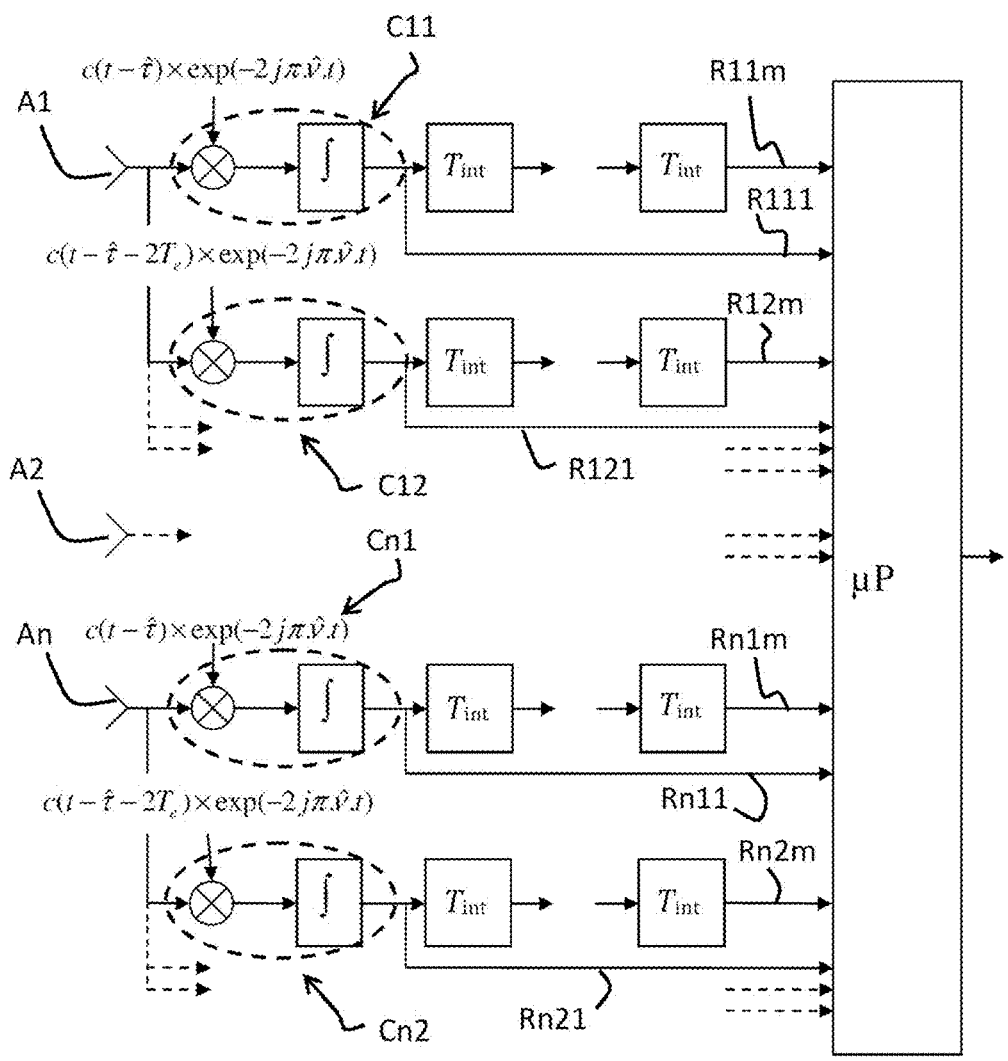
Figure 3A:
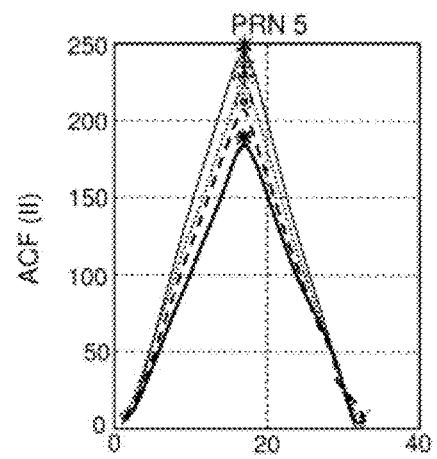
Figure 3B:
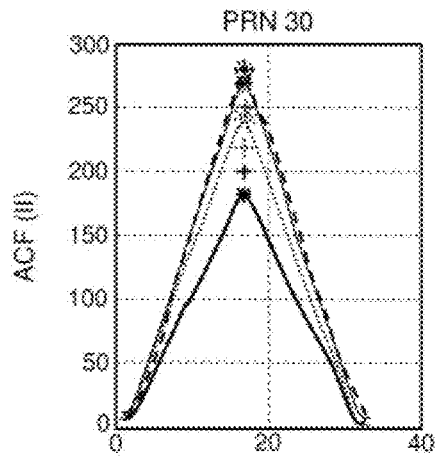
Figure 3C:
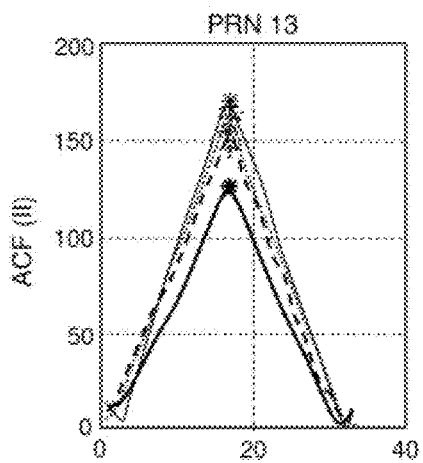
Figure 3D:
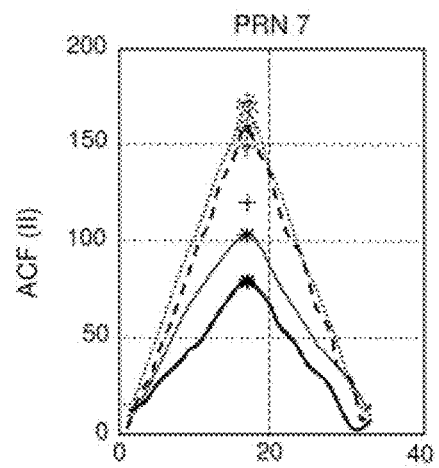
Figure 3E:
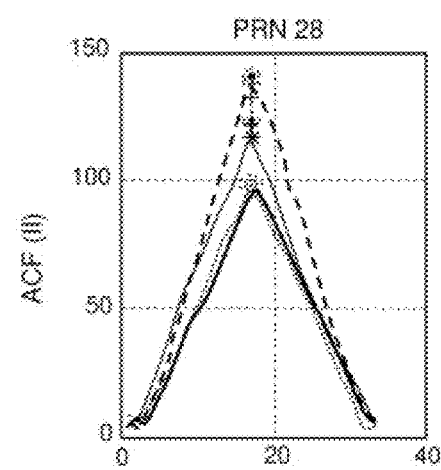
Figure 3F:
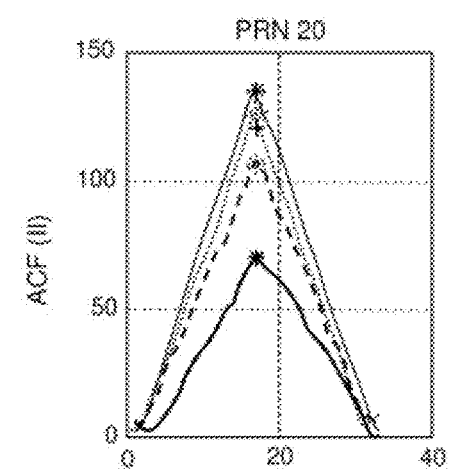

FIG. 2 describes an architecture of a location device according to the invention.

The location device according to the invention comprises a plurality of sensors A1, A2, An. These sensors are elementary antennas designed to pick up the radiolocation signals emitted by the satellites of a navigation system such as the GPS or Galileo system. The network of sensors A1, A2, An makes it possible to obtain the directional information by spatial sampling of the wavefront received.

The location device also comprises means for processing the signals received by the set of sensors A1, A2 to An. Signal processing lines are connected at the output of each sensor.

We describe in this paragraph the signal processing chain lying between the output of the sensor A1 and the calculation means implementing the maximum likelihood algorithm. The presence of the RF stage, of frequency lowering and of an optional analogue-digital converter at the output of each antenna not being useful to the understanding of the invention, these elements are not represented in FIG. 2, the reader will be able to consider them as forming part of the sensors. The sensor A1 is linked to a first line comprising in succession a correlator C11 (consisting of a multiplier and of an integrator), and then a first delay line R111 and an m$^{th}$ delay line R11m, the said lines being connected in parallel. The output of the delay lines is connected to calculation means that can implement a maximum likelihood algorithm.

The set of correlators makes it possible to obtain an estimation of the intercorrelation function intercorrelating the local code (generated in the receiver) and the code received so as to be able to estimate the delays of the various signals.

The delay lines will sample the post-correlation signal with a sampling period of Tint so as to be able to estimate the Doppler frequencies of the various signals.

Following the correlation processing, delay lines R111 and R11m are connected at the output of the integrator. These delay lines are disposed in parallel. The disparity introduced by each delay line always corresponds to a multiple of the duration of integration of the correlator. By way of nonlimiting example, the first delay line R111 does not introduce any delay, a delay of Tint is introduced by the second delay line R112 and the m$^{th}$ delay line R11m introduces a delay of (m−1)Tint. The processing line can comprise a number m of delay lines in parallel, each delay line being spaced apart by a duration Tint corresponding to the duration of integration of the correlators. The delay lines can be devised by any means of signal processing, analogue or digital. Likewise, the sensor A1 is linked to a second processing line comprising in succession a correlator C12 spaced apart by a fraction of the symbol period of the spreading code (duration denoted Te in FIG. 2) with respect to the correlator C11 and m delay lines R121 to R12m arranged in the same manner as the first processing line. The sensor A1 can be linked to third and fourth processing lines or indeed more which are not presented in FIG. 2. The processing lines comprising the correlators C11 and C12 are identical. More generally, the structures of the processing lines at the output of each antenna are mutually identical.

According to a simpler embodiment, the processing lines might not comprise any delay lines. In this case, the outputs of the correlators are connected directly to the calculation means μP implementing a maximum likelihood algorithm.

The location device comprises a plurality of sensors A1 to An and each sensor is connected to a processing line such as described previously following the sensor A1. The sensors and the processing lines, comprising the delay lines, form a multi-correlator spatio-temporal network.

The delay lines are linked directly on multiples inputs to calculation and processing means μP implementing a maximum likelihood algorithm. Several types of maximum likelihood algorithm can be implemented. Preferably, an algorithm of SAGE type processes the signals arising from the delay lines with the aim of estimating the parameters characteristic of the signals received (incident direction in terms of azimuth and elevation, delay, Doppler for example). Estimation of these parameters makes it possible to discriminate the useful signal from the multi-path signals. The maximum likelihood algorithm is able to process the signals originating from the system implemented according to a multi-correlator spatio-temporal architecture.

In the present invention, in contradistinction to the assumptions made in application WO 2012/025306, it is assumed that the sensors A1, A2, An are all different and thus exhibit different radiation patterns.

An example of moduli of correlation functions measured by means of a device such as that of FIG. 2 is illustrated in FIGS. 3a-3f for a device comprising four antennas, for various sequences of spreading codes PRN at the same instant. In each of the six charts of FIGS. 3a-3f, the correlation functions obtained for each of the four reception pathways have been represented. It is noted in these figures that the measured correlation functions are different for each reception pathway and are also different depending on the spreading code PRN used.

It follows from these two charts that the gains differ between the various antennas of a device as a function of the direction of arrival of the signals. Thus, the application of the procedure for estimating the parameters of multi-path signals, such as is described in application WO 2012/025306, is inoperative since it results in non-received signals being made to appear virtually. Indeed, this procedure considers that the antenna gains are identical for each of the reception pathways.

FIGS. 3a-3f furthermore identify in the form of "+" symbols the theoretical levels received, taking into account measurements in an anechoic chamber, of the radiation patterns of the antennas. It may be verified therein that these levels do not overlie the correlation peaks of the signals measured and that the ranking of the pathways is not reproduced either.

Finally, this figure identifies in the form of "*" symbols the estimated levels of the signals received by means of the present invention. This time it may be verified therein that the estimated levels correspond well to the levels received on the four reception pathways, thereby validating the contribution of the invention.

The steps of the calculation of the parameters of the signals (direct path and multi-paths) received by the device of FIG. 2 are now detailed.

The expression y(t) for the signal converted to baseband at the output of identical antennas can be cast into the form:

$$y(t) = \sum_{l=0}^{L-1} a(\theta_l, \varphi_l) \times \gamma_l \times \exp(2j\pi \cdot v_l \cdot t) \times c(t - \tau_l) + b(t)$$

where the index "l" corresponds to the number of paths received for one and the same signal (direct path and echoes), the number '0' being assigned to the direct path, $a(\theta,\varphi)$ represents the direction vector of the network of antennas as a function of the angles of arrival $\theta$ and $\varphi$ of each signal. $\gamma_l$ represents the complex amplitude of the signal, $v_l$ its Doppler frequency, $\tau_l$ its propagation delay, c(.) the spreading code and finally b(.) represents the thermal noise vector at the output of each antenna.

This signal thereafter passes through the correlators represented in FIG. 2. The expression X for the signal received post-correlation for the proposed multi-correlator STAP architecture can be cast into the following vectorized form:

$$X = \sum_{l=0}^{L-1} X_l(\psi_l) + b_{mp,T_{int}}$$

with $$\psi_l = [\tilde{\gamma}_l, \theta_l, \varphi_l, \tau_{rl}, v_{rl}]^T$$

$$X_l(\psi_l) = \tilde{\gamma}_l \times a(\theta_l, \varphi_l) \otimes \tilde{R}_C(\varepsilon_\tau - \tau_{rl}, \varepsilon_v - v_{rl})$$

It is recalled that m represents the number of delay lines per processing line, p designates the total number of processing lines per antenna and n represents the number of antennas.

$b_{mp, Tint}$ represents the thermal noise vector at the output of each antenna, integrated over a duration $T_{int}$, $\psi_l$ represents the vector of parameters to be estimated for path 'l' and X, $X_l$ and $b_{mp, Tint}$ are of dimension m×n×p.

The relative delays and Doppler shifts of path 'l' with respect to the direct path are denoted $\tau_{rl}$ and $v_{rl}$. The correlator is slaved to the direct path and commits an error $\varepsilon_\tau$ in the code (delay reckoned positively) with respect to the reference path of index '0' and $\varepsilon_v$ in the frequency of the direct path. $\tilde{\gamma}_l$ designates the complex amplitude of the post-correlation signal. The notation $(.)^T$ represents the transpose of a vector, $(.)^H$ represents the conjugate transpose of a vector and the operator $\otimes$ represents the Kronecker product.

The temporal correlation matrix $\tilde{R}_C$ of the signal is constructed in the following manner:

Initially, the multi-correlator outputs are concatenated into a column vector to reconstruct a sampled intercorrelation function intercorrelating the signal received with the local code.

These intercorrelation functions obtained for various post-correlation instants are always concatenated into a column vector so as to plot the temporal evolution of the intercorrelation functions. This temporal evolution will make it possible to characterize the relative Dopplers of the echoes.

$$\tilde{R}_C(\varepsilon_\tau - \tau_{rl}, \varepsilon_v - v_{rl}) =$$

$$\begin{bmatrix} r\left(\varepsilon_\tau - \tau_{rl,1} + \frac{(p-1)}{2}T_e\right) \times \exp[-2j\pi \cdot (\varepsilon_v - v_{rl}) \cdot T_{int}] \\ \vdots \\ r\left(\varepsilon_\tau - \tau_{rl,1} - \frac{(p-1)}{2}T_e\right) \times \exp[-2j\pi \cdot (\varepsilon_v - v_{rl}) \cdot T_{int}] \\ r\left(\varepsilon_\tau - \tau_{rl,2} + \frac{(p-1)}{2}T_e\right) \times \exp[-2j\pi \cdot (\varepsilon_v - v_{rl}) \cdot 2 \cdot T_{int}] \\ \vdots \\ r\left(\varepsilon_\tau - \tau_{rl,2} - \frac{(p-1)}{2}T_e\right) \times \exp[-2j\pi \cdot (\varepsilon_v - v_{rl}) \cdot 2 \cdot T_{int}] \\ \vdots \\ r\left(\varepsilon_\tau - \tau_{rl,m} - \frac{(p-1)}{2}T_e\right) \times \exp[-2j\pi \cdot (\varepsilon_v - v_{rl}) \cdot m \cdot T_{int}] \end{bmatrix}$$

with r( ) the intercorrelation function intercorrelating a code received with its local replica.

The relative Doppler shifts are assumed constant over the duration of processing m. $T_{int}$, the relative delays evolve as:

$$\tau_{rl,m} = \tau_{rl,0} + m\frac{v_{rl}}{f_C}T_{int}$$

where $f_c$ designates the signal carrier frequency.

According to the multi-correlator spatio-temporal architecture proposed in FIG. 2, the temporal autocorrelation matrix $\tilde{R}_P$ of the post-correlation noise is equal to the matrix of the pre-correlation local code and is independent of the Doppler, it may be written:

$$\tilde{R}_P = \begin{bmatrix} r(0) & r(Te) & \ldots & & \ldots & r(p \cdot Te) \\ r(Te) & r(0) & r(Te) & & & \vdots \\ \vdots & r(Te) & r(0) & r(Te) & & \vdots \\ \vdots & & r(Te) & r(0) & r(Te) \\ r(p \cdot Te) & \ldots & & \ldots & r(Te) & r(0) \end{bmatrix}$$

Assuming the noise to be spatially white, the spatio-temporal autocorrelation matrix of the post-correlation noise may be written:

$$E(b_{NP,T_{int}} \times b_{NP,T_{int}}^H) = C = \tilde{\sigma} \times I_{mn} \otimes \tilde{R}_P$$

Finally, the spatio-temporal correlation matrix is denoted $\check{R}_C^H$ $$\check{R}_C^H(\varepsilon_\tau - \tau_{rl}, \varepsilon_v, v_{rl}) = \tilde{R}_C^H(\varepsilon_\tau - \tau_{rl}, \varepsilon_v - v_{rl}) \times [I_m \otimes \tilde{R}_P^{-1}]$$

i.e.:

$$\breve{R}_C^H(\varepsilon_\tau - \tau_{rl}, \varepsilon_v - v_{rl}) =$$

$$\left\{ \begin{bmatrix} \begin{bmatrix} r\left(\varepsilon_\tau - \tau_{rl,1} + \frac{(p-1)}{2}T_e\right) \\ \vdots \\ r\left(\varepsilon_\tau - \tau_{rl,1} - \frac{(p-1)}{2}T_e\right) \end{bmatrix}^H \times \tilde{R}_P^{-1} \times \exp[-2j\pi \cdot (\varepsilon_v - v_{rl}) \cdot T_{int}] \end{bmatrix}^T \\ \begin{bmatrix} \begin{bmatrix} r\left(\varepsilon_\tau - \tau_{rl,2} + \frac{(p-1)}{2}T_e\right) \\ \vdots \\ r\left(\varepsilon_\tau - \tau_{rl,2} - \frac{(p-1)}{2}T_e\right) \end{bmatrix}^H \times \tilde{R}_P^{-1} \times \exp[-2j\pi \cdot (\varepsilon_v - v_{rl}) \cdot 2 \cdot T_{int}] \end{bmatrix}^T \\ \vdots \\ \begin{bmatrix} \begin{bmatrix} r\left(\varepsilon_\tau - \tau_{rl,N} + \frac{(p-1)}{2}T_e\right) \\ \vdots \\ r\left(\varepsilon_\tau - \tau_{rl,N} - \frac{(p-1)}{2}T_e\right) \end{bmatrix}^H \times \tilde{R}_P^{-1} \times \exp[-2j\pi \cdot (\varepsilon_v - v_{rl}) \cdot m \cdot T_{int}] \end{bmatrix}^T \right\}^T$$

The principle of the SAGE algorithm consists in decomposing the signal received on the set of paths and in estimating, by maximum likelihood, the parameters of each path.

For the architecture and the signal model proposed, the opposite of the Log-likelihood function $\Lambda_l(\psi_l)$ for path 'l' may be written to within a constant and a multiplicative coefficient:

$$\Lambda_l(\psi_l) = (X_l(\psi_l) - X_l)^H \times C^{-1} \times (X^l(\psi^l) - \hat{X}_l)$$

where the notation ˆ designates the estimate of a quantity. It may then be shown that maximizing the likelihood for path 'l' amounts to maximizing the term $\tilde{\Lambda}_l(\psi_l)$ defined by:

$$\tilde{\Lambda}_l(\psi_l) = \frac{\left\| \left[ a^H(\theta_l, \varphi_l) \otimes \breve{R}_C^H(\varepsilon_\tau - \tau_{rl}, \varepsilon_v - v_{rl}) \right] \times \hat{X}_l \right\|^2}{m \times \breve{R}_C^H(\varepsilon_\tau - \tau_{rl}, \varepsilon_v - v_{rl}) \times \breve{R}_C(\varepsilon_\tau - \tau_{rl}, \varepsilon_v - v_{rl})}$$

The "E-Step" phase of the SAGE algorithm consists in isolating a particular path, and the "M-Step" phase consists in estimating the parameters of the path by maximum likelihood. One then loops over the set of paths and then one loops back iteratively until convergence of the algorithm. The convergence criterion generally pertains to the norm of the update of the vector of parameters to be estimated. It is also possible to add a criterion on the amplitude of the path to be estimated to distinguish it from noise.

The equations for the "E-Step" and "M-Step" phases in pursuit mode are as follows.

During the "E-Step" phase, the parametric model of the signals estimated at the previous iterations is subtracted from the received signals in the following manner:

$$\hat{X}_{l_0} = X - \sum_{\substack{l=0 \\ l \neq l_0}}^{L-1} X_l(\hat{\psi}_l)$$

The parametric signal model is updated in the following manner to take into account amplitudes of the received signal that are potentially different on the various reception antennas:

$$\psi_l = [\tilde{\gamma}_l, \theta_l, \varphi_l, \tau_{rl}, v_{rl}]^T$$

$$X_l(\psi_l) = [|\$]\$\Lambda\$\$[|S]\$\Lambda A\hat{T}[|\$]\$\Lambda g \hat{g}_l \otimes \tilde{R}_C(\varepsilon_\tau - \tau_{rl}, \varepsilon_v - v_{rl})$$

In the latter form, the complex amplitude is no longer a scalar but a vector of dimension equal to the number of reception pathways of the device according to the invention.

During the "M-Step" phase, the parameters of the following multi-path signal (from among the L–1 multi-path signals and the useful signal) are estimated in the following manner.

Firstly, one searches for the relative delay and relative Doppler of the signal to be estimated. In order to reduce the calculational load, the vector $Y_{l_0}$ which utilizes the estimates of the DOAs (direction of arrival of the signals) is constructed initially, and then the likelihoods for the relative delay and Doppler in the neighbourhood of the solutions of the previous iteration are maximized:

$$Y_{l_0} = \left[ a(\hat{\theta}_l, \hat{\varphi}_l)^H \otimes I_{NP} \right] \times \hat{X}_{l_0}$$

$$\hat{\tau}_{rl_0} = \underset{\tau_{rl}}{\operatorname{argmax}} \left( \frac{\left| \breve{R}_C^H(\varepsilon_\tau - \tau_{rl}, \hat{\varepsilon}_v - \hat{v}_{rl}) \times Y_{l_0} \right|^2}{\breve{R}_C^H(\varepsilon_\tau - \tau_{rl}, \hat{\varepsilon}_v - \hat{v}_{rl}) \times \breve{R}_C(\varepsilon_\tau - \tau_{rl}, \hat{\varepsilon}_v - \hat{v}_{rl})} \right)$$

$$\hat{v}_{rl_0} = \underset{v_{rl}}{\operatorname{argmax}} \left( \frac{\left| \breve{R}_C^H(\hat{\varepsilon}_\tau - \hat{\tau}_{rl}, \varepsilon_v - v_{rl}) \times Y_{l_0} \right|^2}{\breve{R}_C^H(\hat{\varepsilon}_\tau - \hat{\tau}_{rl}, \varepsilon_v - v_{rl}) \times \breve{R}_C(\hat{\varepsilon}_\tau - \hat{\tau}_{rl}, \varepsilon_v - v_{rl})} \right)$$

Thereafter, one searches for the directions of arrival (DOAs) of the signal to be estimated on the various sensors. In order to reduce the calculational load, the vector $Z_{l_0}$ which utilizes the estimates of the relative delays and relative Doppler is constructed initially, and then the likelihoods for the DOAs in the neighbourhood of the solutions of the previous iteration are maximized:

$$Z_{l_0} = \left[I_m \otimes \check{R}_C^H(\hat{\varepsilon}_\tau - \hat{\tau}_{rl}, \hat{\varepsilon}_v - \hat{v}_{rl})\right] \times \hat{X}_{l_0}$$

$$\hat{\theta}_{l_0} = \underset{\theta_l}{\mathrm{argmax}}(|a(\theta_l, \hat{\varphi}_l)^H \times Z_{l_0}|)$$

$$\hat{\varphi}_{l_0} = \underset{\varphi_l}{\mathrm{argmax}}(|a(\hat{\theta}_l, \varphi_l)^H \times Z_{l_0}|)$$

Finally, the post-correlation complex amplitude of the signal to be estimated for each sensor is determined by assuming the amplitudes to be different, a priori, for each sensor.

Accordingly, an independent estimation of the complex amplitudes on the various antennas is performed:

$$\hat{\tilde{\gamma}}_{l\_temp} = \frac{\left[I_m \otimes \check{R}_C^H(\hat{\varepsilon}_\tau - \hat{\tau}_{rl}, \hat{\varepsilon}_v - \hat{v}_{rl})\right]^H \times \hat{X}_l}{\check{R}_C^H(\hat{\varepsilon}_\tau - \hat{\tau}_{rl}, \hat{\varepsilon}_v - \hat{v}_{rl}) \times \check{R}_C(\hat{\varepsilon}_\tau - \hat{\tau}_{rl}, \hat{\varepsilon}_v - \hat{v}_{rl})}$$

Next, the resulting vector is projected onto the sub-space defined by the estimated direction of arrival:

$$a_l = a(\hat{\theta}_l, \hat{\varphi}_l) \cdot |\hat{\tilde{\gamma}}_{l\_temp}|$$

$$\hat{\tilde{\gamma}}_l = \frac{(a_l^H \times \hat{\tilde{\gamma}}_{l\_temp}) \times a_l}{a_l^H \times a_l}$$

where the operator $<<\phi>>$ designates a term-by-term vector product and/or the complex amplitude estimated in the last step is no longer a scalar but a vector of dimension the number of reception pathways of the device according to the invention.

Stated otherwise, the component corresponding to the direction of arrival estimated in the previous step is preserved in the independent estimation of the complex amplitude. Thus, the estimated direction of arrival is favoured.

In practice, it is understood that the spatio-temporal correlation matrix $\check{R}_C^H$ will not need to be recalculated numerically on the fly during the processing by the receiver so as not to overburden the calculational load. At worst, it will be possible to pre-calculate and store numerical values, or indeed, under certain assumptions, it will be possible to propose an analytical solution.

For example, if the evolution of the delay as a function of the relative Doppler is neglected (this amounting to neglecting a variation of the order of $6.10^{-10}$ s for a Doppler of 100 Hz and a duration of observation of 10 ms) and if the term $(\varepsilon_\tau - \tau_{rl})$ is a multiple of the timestep between the correlators, then each block (term corresponding to 1 post-correlation delay line) of the matrix $\check{R}_C$ reduces to a Dirac multiplied by a phase term:

$$\check{R}_C(k \cdot T_e, \varepsilon_v - v_{rl}) \approx \begin{Bmatrix} \delta_P(k) \times \exp[-2j\pi \cdot (\varepsilon_v - v_{rl}) \cdot T_{int}] \\ \delta_P(k) \times \exp[-2j\pi \cdot (\varepsilon_v - v_{rl}) \cdot 2 \cdot T_{int}] \\ \vdots \\ \delta_P(k) \times \exp[-2j\pi \cdot (\varepsilon_v - v_{rl}) \cdot m \cdot T_{int}] \end{Bmatrix}^T$$

with:

$$\delta_P(k) = \begin{matrix} [0 \ldots 0 \ 1 \ 0 \ldots 0]^T \\ -\frac{P-1}{2} \ldots k-1 \ k \ k+1 \ldots \frac{P-1}{2} \end{matrix}$$

FIG. 4 shows diagrammatically, on a flowchart, the main steps of the method for estimating the parameters of the multi-path signals and of the useful signal, according to the invention.

A first step 401 of the method consists in correlating the signal received by the sensors with a local code by means of the correlators of the device.

A second step 402 of the method consists in constructing, for each sensor, a sampled intercorrelation function intercorrelating the signal received with the local code.

A third step 403 of the method consists in determining a spatio-temporal intercorrelation function on the basis of the concatenation of the intercorrelation functions obtained in the previous step for each sensor.

Next, the parameters representative of the useful signal and of the multi-path signals are estimated, in an iterative manner, by applying a maximum likelihood algorithm.

Accordingly, at each iteration, the parametric model or models of signals whose representative parameters have been estimated at the previous iterations is or are subtracted, during step 404, from the spatio-temporal intercorrelation function.

Next, the parameters representative of a multi-path signal or of the useful signal are estimated in step 405 by applying a maximum likelihood algorithm to the result of the previous subtraction. This step 405 comprises at least the following sub-steps:

Estimate the direction of arrival of the signal by utilizing all the sensors jointly, Estimate the complex amplitude of the signal independently for each sensor, Project the estimated complex amplitude onto the sub-space defined by the estimated direction of arrival.

The invention makes it possible to discriminate the useful signal from the multi-path signals by taking into account the different characteristics of the reception pathways of the device. This advantage is obtained through the independent estimation of the complex amplitude of the signal received by each sensor.

The invention applies to the reference or observation ground stations of constellations of navigation satellites. This invention can be used in mobile terminals to improve the navigation solution in urban, or indeed airport, environments.

The invention claimed is:

1. A method for estimating the parameters of useful signal and multi-path signals originating from a radiolocation signal emitted by a satellite, by a location device comprising at least two sensors able to receive the said signal, each of said sensors being connected to at least two lines for processing the signals, each processing line comprising a correlator and at least one delay line able to introduce a delay corresponding to a multiple of the duration of integration of said correlators, the method comprising the steps of:

correlating the signal received by the said sensors with a local code by means of said correlators, constructing, for each sensor, a sampled intercorrelation function intercorrelating the signal received with the local code, for various post-correlation instants, determining a spatio-temporal intercorrelation function on the basis of a concatenation of the intercorrelation functions obtained in the previous step for each sensor, executing iteratively, for each multi-path signal and the useful signal, the sub-steps of:

subtracting, from the spatio-temporal intercorrelation function, a parametric model or models of signals estimated at the previous iterations, estimating the parameters representative of a multi-path signal or of the useful signal by applying a maximum likelihood algorithm to the result of the previous subtraction, by applying the sub-steps of:

estimating a direction of arrival of the signal by utilizing all the sensors jointly, estimating a complex amplitude of the signal independently for each sensor, by using the estimated direction of arrival, projecting the estimated complex amplitude onto a sub-space defined by the estimated direction of arrival so as to preserve, in the independent estimation of the complex amplitude, the component corresponding to the direction of arrival estimated in the previous step.

2. The estimation method according to claim 1, in which the said representative parameters include the propagation delay, the Doppler frequency and the direction of arrival of a signal.

3. A location device able to discriminate a useful signal from multi-path signals, the device comprising at least two sensors of radiolocation signals emitted by a satellite, each of the said sensors being connected to at least two lines for processing the signals, each processing line comprising a correlator and at least one delay line able to introduce a delay corresponding to a multiple of the duration of integration of the correlators, the device comprising means for processing the signals configured to implement the method according to one of the preceding claims.

4. The location device according to claim 3, in which a correlator of a first processing line is spaced apart by a fraction of a symbol period of the spreading code with respect to the correlator of a second processing line.

5. The location device according to claim 3, in which the maximum likelihood estimation algorithm is a "SAGE" algorithm.

* * * * *